United States Patent Office 3,637,621
Patented Jan. 25, 1972

---

3,637,621
PROCESS FOR THE POLYMERIZATION OF VINYL CHLORIDE
Sergio Lo Monaco, Vicenza, Corrado Mazzolini, Mestre, Luigi Patron, Sestriere, and Alberto Moretti, Venice, Italy, assignors to Chatillon Società Anonima Italiana per le Fibre Tessili Artificiali S.p.A., Milan, Italy
No Drawing. Continuation-in-part of application Ser. No. 784,191, Dec. 16, 1968. This application Feb. 26, 1970, Ser. No. 14,671
Claims priority, application Italy, Dec. 19, 1967, 24,081/67
Int. Cl. C08f *1/04, 1/62, 3/30*
U.S. Cl. 260—85.5
15 Claims

---

ABSTRACT OF THE DISCLOSURE

Bulk polymerization of vinyl chloride in the presence of a catalytic system comprising an organic hydroperoxide and a salt of a mono-ester of sulphurous acid having the general formula:

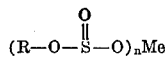

in which R is an alkyl, cycloalkyl or aryl radical having from 1 to 12 carbon atoms, Me is a metal of the first or second group of the Periodic System or aluminum and $n$ is 1, 2 or 3 depending on the valency of Me, wherein the polymerization is conducted continuously or semi-continuously at a temperature higher than 0° C.

---

This application is a continuation-in-part of U.S. patent application Ser. No. 784,191 filed Dec. 16, 1968.

The present invention relates to a process for the bulk polymerization of vinyl chloride at a temperature higher than 0° C., and represents an improvement over the invention disclosed in applicants' copending U.S. patent application Ser. No. 784,191 filed Dec. 16, 1968.

In said copending application, there is described a process for the bulk polymerization of vinyl chloride at a temperature below 0° C. by using a catalytic system consisting essentially of an organic hydroperoxide and a salt of a mono-ester of sulphurous acid having the general formula

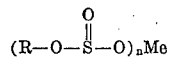

in which R is an alkyl, cycloalkyl or aryl radical having from 1 to 12 carbon atoms, Me is a metal of the first or second group of the Periodic System or aluminum and $n$ is 1, 2 or 3 depending on the valency of Me.

As described in said application, the bulk polymerization can be carried out continuously, semi-continuously or batchwise. Such a catalytic system is characterized by a high decomposition rate even at temperatures much lower than 0° C., such as at between −20° C. and −60° C. At such low temperatures in fact, even by using hydroperoxide concentrations lower than 0.1% in respect to the monomer, high polymerization rates are obtained.

This particular kinetic behavior of the aforementioned catalytic system therefore could not permit foreseeing its applicability to the polymerization of vinyl chloride at high temperature, for instance higher than 10° C. It is known in fact that, if the decomposition rate of a catalytic system is too high, there is inhibition of the polymerization due to the recombination of the polymeric radicals with the primary radicals.

It has now surprisingly been found that the bulk polymerization of vinyl chloride at a temperature higher than 0° C., can be effectively initiated by using the catalytic system consisting of an organic hydroperoxide and a salt of a mono-ester of sulphurous acid having the general formula

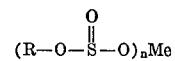

in which R, Me and $n$ have the aforementioned meaning, provided that the polymerization is carried out in a continuous or semicontinuous process with gradual addition of the components of the catalytic system to the monomer.

It is in fact expressly pointed out that, if the polymerization is carried out by instantaneously adding to the monomer contained in a polymerization autoclave, the entire amount of the components of the catalytic system provided in the formulation (in a process that can be called discontinuous) no appreciable polymerization is obtained.

In the following Table I the polymerization conversions and the intrinsic viscosity of the polymer obtained by bulk polymerization carried out by continuous, semi-continuous and discontinuous processes, by using the aforementioned catalytic system, are reported.

TABLE I

| Polymerization process | Catalyst feeding time in hours | Reaction or permanence time of the reacting agents in contact with each other (dwell time) in hours | Conversion percent | Intrinsic viscosity $[\eta]$ dl./g |
|---|---|---|---|---|
| Discontinuous | 0 | 10 | 1.5 | 0.04 |
| Semi-continuous | 10 | 10 | 26 | 1.6 |
| Continuous | | 10 | 28 | 1.5 |

The polymerization was carried out in bulk and at 30° C. in the presence of 0.15%, with respect to the monomer, of cumene hydroperoxide and 0.25% of sodium methyl sulfite, the latter fed in a 10% methanol solution.

The catalytic system used in the process of the present invention offers the advantage, in comparison to the catalysts commonly used in the bulk polymerization of vinyl chloride, of being industrially effective even if used in small amounts due to its high effectiveness and its high decomposition rate. The possibility of carrying out the polymerization with low quantities of catalytic formulations, not only represents a considerable economical advantage but makes it possible to obtain polymers having desirable characteristics of color and of thermal stability.

As stated in said copending application, Ser. No. 784,191, by organic hydroperoxides are meant all the organic compounds having the general formula

R—O—O—H in which R may be a linear or branched alkyl radical, a cycloalkyl radical, an aryl radical or an aryl-alkyl radical.

Examples of organic compounds of the general formula R—O—O—H which may be conveniently used in the process of this invention are: methyl-, ethyl-, n-propyl-, tert.butyl-, n-butyl-, amyl-, hexyl-, octyl-, etc. hydroperoxide; phenyl-ethyl hydroperoxide; phenyl-isobutyl - hydroperoxide; phenyl - isopropyl - hydroperoxide; etc. Particularly advantageous results are attained by using cumene hydroperoxide or tertiary-butyl-hydroperoxide.

The concentration of organic hydroperoxide is not critical and generally may vary between 0.01 and 3% by weight with respect to the monomers. Hydroperoxide concentrations not higher than 0.4% however are in general preferred. Concentrations here and elsewhere in this specification are by weight unless otherwise specified.

The organic hydroperoxide can be fed to the reaction mass either as such or in solution in a suitable solvent such as methyl, ethyl or propyl alcohol, etc.

Of the sulphur compounds having the general formula

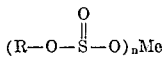

in which "R," "Me" and "n" have the aforementioned meanings, those in which "R" is an alkyl radical having from 1 to 4 carbon atoms and in which "Me" is sodium, potassium or magnesium in practice proved to be particularly effective.

The only condition to be satisfied by such salts of the mono-esters of the sulphurous acid is that the sulphur atom shall be easily oxidized by the organic hydroperoxide. The salts of the mono-esters of the sulphurous acid may be chosen from amongst: sodium methyl-sulphite, potassium methyl-sulphite, lithium methyl-sulphite, magnesium methyl-sulphite, aluminum methyl-sulphite, sodium ethyl-sulphite, potassium ethyl-sulphite, lithium ethyl sulphite, magnesium ethyl-sulphite, sodium n-propyl-sulphite, potassium iso-propyl-sulphite, etc., sodium butyl-sulphite, magnesium butyl-sulphite, potassium butyl-sulphite, etc.; sodium tert.butyl-sulphite, potassium tert.butyl-sulphite, sodium n-amyl-sulphite, potassium n-amyl-sulphite, sodium cyclo-hexyl-sulphite, sodium cyclopentyl sulphite, sodium phenyl-sulphite, sodium benzyl-sulphite, sodium phenyl-ethyl-sulphite, etc.

The concentration of said salts of the mono-esters of sulphurous acid in general varies from 0.01 to about 2% with respect to the monomers. Concentrations between 0.035% and 0.5 are particularly preferred. Concentrations higher than 2% can also be used but they are not advisable since they do not involve an appreciable increase in the polymerization rate but only a higher consumption.

The salts of the mono-esters of sulphurous acid can be added to the reaction medium either as such or, preferably dissolved in an inert, organic solvent. Suitable solvents are saturated aliphatic alcohols having from 1 to 5 carbon atoms and among them methyl alcohol and ethyl alcohol are preferred. The nature and amount of such solvent has no influence on the polymerization course even if, for economical reasons, concentrated solutions are preferred.

The temperature at which the polymerization is carried out can vary from about 0° C. to +100° C. and preferably between 20° C. and 60° C.

By the term "bulk polymerization" is meant not only the polymerization carried out in the undiluted monomer but also that in the presence of non-reacting organic compounds which are liquid at the polymerization temperature and have a fluidizing action on the polymerization mass in order to render this latter more easily stirrable. The presence of such organic compounds has no influence on the polymerization reaction and their concentration if desired can even be equal to that of the monomer. As organic fluidizing agents the following substances may be used: aliphatic hydrocarbons, aryl-hydrocarbons, cycloalkyl hydrocarbons, halogenated saturated hydrocarbons, etc.

To the polymerization mass small quantities, such as e.g., from 50 to 1,000 p.p.m. of alkyl mercaptans with respect to the monomer can be added to regulate the molecular weight of the polymer.

It has been observed that alkyl mercaptans, besides acting as chain regulators, act also as fluidizers of the polymerization mixture. Among the suitable mercaptans those having 1 to 15 carbon atoms are preferred and those having at most 4 carbon atoms have practically given the best results.

It is advisable to carry out the polymerization in the absence of oxygen which displays an inhibiting effect on the polymerization. In general for this purpose suitable inert gases such as, e.g., nitrogen are used.

As stated above an essential condition in order that the polymerization takes place is that the polymerization process be carried out continuously or semi-continuously.

By continuous polymerization is meant the process in which the components of the catalytic system and the monomer are continuously and separately fed to the reactor; the monomer flow-rate with respect to the reactor's volume represents the average time of permanence of the reactants in contact with each other (dwell time). In this process the reaction mixture is continuously removed from the reactor by means of an overflow.

By semi-continuous polymerization it is meant the process in which the components of the catalytic system are fed over a prolonged period of time to a closed reactor containing the monomer. In this case the polymer is recovered at the end of the reaction.

The polymerization may be inhibited at any desired stage and at the desired molecular weight by treating the reaction mass with an aqueous or alcoholic solution of a hydroxylamine salt, preferably hydroxylamine hydrochloride or sulphate.

The polyvinylchloride obtained by the process of the present invention is very white and has an excellent thermal stability, a homogeneous molecular weight as well as a high apparent density; this last property being highly desired in the application of this polymer in the production of fibers and plastic materials.

It is to be understood that the catalytic systems used in the process of the present invention may also be applied advantageously for preparing copolymers of vinyl chloride containing up to 50% by weight of at least one other ethylenically unsaturated monomer co-polymerizable with vinyl chloride. The only difference with respect to the above described process is that in that case the starting monomers shall be a mixture of vinyl chloride with one or more ethylenically unsaturated monomers copolymerizable with the vinyl chloride.

By the term "ethylenically unsaturated monomers" reference is meant to all organic compounds that contain the group C=C. Examples of such compounds are: vinyl and vinylidene compounds such as vinylidene fluoride or chloride, vinyl fluoride; vinyl esters of carboxylic aliphatic acids containing from 2 to 18 carbon atoms, such as for instance: vinyl esters of acetic acid, of propionic acid, etc.; monomers of the acrylic type, such as acrylic acid, methacrylic acid or their derivatives, such as acrylonitrile, acrylates or methacrylates of aliphatic alcohols containing from 1 to 12 carbon atoms, etc.

In order still better to illustrate the following examples are given.

EXAMPLES

Into a 3-liter autoclave, provided with an outer heating jacket, an agitator and a thermometer and previously charged with 2,000 g. of vinyl chloride and 500 g. of ethyl chloride, the following substances are fed over a period of 10 hours:

an organic hydroperoxide of the type and with the feeding rate reported in the following Table II,
a salt of a mono-ester of sulphurous acid of the type and with the feeding rate reported in Table II.

At the end of feeding, the suspension of polymer thus obtained is discharged into an aqueous solution of hydroxylamine hydrochloride kept at 50° C. and at pH 6 by addition of sodium bicarbonate in order to stop the polymerization. The polymer is separated by centrifugation and then washed with water and dried at 70° C. in an oven provided with forced ventilation.

The polymerization conversion, intrinsic viscosity and the apparent density of the polymer obtained are reported in Table II. The intrinsic viscosity [$\eta$] is determined in cyclohexanone at 30° C. and is expressed in dl./g.

The apparent density is expressed in g./cm.$^3$.

TABLE II

| Organic hydroperoxide | | Sulphur compound | | Temperature °C. | Conversion | Intrinsic viscosity | Apparent density |
|---|---|---|---|---|---|---|---|
| Type | g./h. | Type | G./h. | | | | |
| Cumene hydroperoxide | 0.25 | Sodium methyl sulphite | 0.39 | 20 | 20.5 | 1.07 | 0.41 |
| Do | 0.15 | Magnesium methyl sulphite | 0.21 | 40 | 33 | 1.35 | 0.43 |
| tert.Butyl hydroperoxide | 0.10 | Magnesim ethyl sulphite | 0.27 | 50 | 41 | 1.41 | 0.47 |
| Do | 0.09 | Potassium methyl sulphite | 0.27 | 30 | 30 | 1.35 | 0.43 |

We claim:

1. A process for bulk polymerization of vinyl chloride consisting essentially conducting the polymerization in the presence of a catalytic system consisting essentially of an organic hydroperoxide in a concentration varying from 0.01% to 3% by weight with respect to the monomers and a salt of a mono-ester of sulphurous acid having the general formula

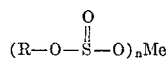

wherein R is an alkyl, aryl, or cyclo-alkyl radical having from 1 to 12 carbon atoms, Me is a metal of group I or II of the Periodic System or aluminum and $n$ is 1, 2 or 3 depending on the valency of Me said salt of a mono-ester of sulphurous acid being present in a concentration between 0.01% and 2% by weight with respect to the monomers, wherein the polymerization is conducted continuously or semi-continuously and at a temperature between 0° C. and 100° C.

2. A process according to claim 1, wherein the concentration of organic hydroperoxide is not higher than 0.4% by weight.

3. A process according to claim 1, wherein the concentration of the salt of mono-ester of sulphurous acid is between 0.035 and 0.5%.

4. A process according to claim 1, wherein the salt of the mono-ester of sulphurous acid is fed in solution in an alcohol having 1 to 5 carbon atoms.

5. A process according to claim 4, wherein the aliphatic alcohol is methyl alcohol or ethyl alcohol.

6. A process according to claim 1, wherein cumene hydroperoxide or tert.butyl-hydroperoxide is used as the organic hydroperoxide.

7. A process according to claim 1, wherein salts of mono-eser of sulphurous acid having the general formula:

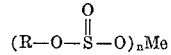

there are used those in which R is an alkyl radical having 1 to 4 carbon atoms, Me is sodium, potassium or magnesium and $n$ is 1 or 2 depending on the valency of Me.

8. A process according to claim 1, wherein the polymerization is carried out in the presence of fluidizing agents.

9. A process according to claim 8, wherein the fluidizing agent is a saturated halogenated hydrocarbon.

10. A process according to claim 1, wherein 50 to 1,000 p.p.m. of an alkyl mercaptan having 1 to 15 carbon atoms are fed to the polymerization mass.

11. A process according to claim 10, wherein the alkyl mercaptan contains at most 4 carbon atoms.

12. A process according to claim 1, wherein the polymerization is inhibited at the desired level by treating the polymerization mass with an aqueous or alcoholic solution of a hydroxylamine salt.

13. A process according to claim 12, wherein the hydroxylamine salt is hydroxylamine hydrochloride or sulphate.

14. A process according to claim 1, wherein vinyl chloride is copolymerized with up to 50% of at least one other ethylenically unsaturated copolymerizatble monomer.

15. A process according to claim 1 wherein the temperature is between 20° C. and 60° C.

References Cited
UNITED STATES PATENTS 3,255,164   3/1966   Visger et al. _____ 260—86.3

JOSEPH L. SCHOFER, Primary Examiner

J. A. DONAHUE, Jr., Assistant Examiner

U.S. Cl. X.R.

260—86.3, 87.1, 85.5A, 87.7, 92.8

UNITED STATES PATENT OFFICE
CERTIFICATE OF CORRECTION

Patent No. 3,637,621       Dated January 25, 1972

Inventor(s)  SERGIO LO MONACO et al

It is certified that error appears in the above-identified patent and that said Letters Patent are hereby corrected as shown below:

The priority claim in the heading should read:

--Claims priority, applications Italy,

December 19, 1967, No. 24,081 A/67

February 28, 1969, No. 13,474 A/69--

Signed and sealed this 10th day of July 1973.

(SEAL)
Attest:

EDWARD M. FLETCHER, JR.
Attesting Officer

Rene Tegtmeyer
Acting Commissioner of Patents